(12) United States Patent
Li

(10) Patent No.: US 7,049,978 B2
(45) Date of Patent: May 23, 2006

(54) VEHICLE PARKING ASSISTANCES SYSTEM

(75) Inventor: Xugang Li, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 97 days.

(21) Appl. No.: 10/739,363

(22) Filed: Dec. 18, 2003

(65) Prior Publication Data

US 2005/0134482 A1   Jun. 23, 2005

(51) Int. Cl.
*G08G 1/00* (2006.01)
*G08G 1/096* (2006.01)

(52) U.S. Cl. .................. 340/932; 340/435; 340/436; 340/932.2

(58) Field of Classification Search ................ 340/435, 340/436, 932.2

See application file for complete search history.

(56) References Cited

U.S. PATENT DOCUMENTS 6,204,754 B1 *  3/2001  Berstis ........................ 340/435
6,483,441 B1 * 11/2002  Hinde ....................... 340/932.2

* cited by examiner

*Primary Examiner*—Daniel Wu
*Assistant Examiner*—Samuel J Walk
(74) *Attorney, Agent, or Firm*—Laura C. Hargitt

(57) ABSTRACT

A vehicle parking system assists the operator of a vehicle with parking the vehicle in an enclosure having a side wall and a rear wall. First and second light sources (e.g. lasers) are mounted on a front most region of the vehicle for directing first and second light beams forward of the vehicle and onto the rear wall. The first light beam makes an angle (preferably forty-five degrees) with the second light beam such that the distance between the first and second light beams on the rear wall is substantially equal to the distance between the front most region of the vehicle and the rear wall.

30 Claims, 3 Drawing Sheets

VEHICLE PARKING ASSISTANCES SYSTEM

FIELD OF THE INVENTION

This invention relates to an apparatus and method for positioning a vehicle, and more particularly to an apparatus and method for assisting the driver of a vehicle (e.g. an automobile) with the parking of such vehicle in an enclosure (e.g. a garage) by providing a visual indication to the driver when the vehicle has reached a predetermined location within the enclosure.

BACKGROUND OF THE INVENTION

Many drivers, especially new drivers, have difficulty judging the distance between the front of a vehicle being operated and an obstacle in front of the vehicle. A similar difficulty applies to obstacles to the rear of the vehicle. This is especially problematic when attempting to park a vehicle in an enclosure such as a garage. For example, if an operator of a vehicle overestimates the distance between the front bumper of the vehicle and the rear wall of the garage (or other obstruction in front of the vehicle), the operator may cause the vehicle to strike the wall (or other obstruction) possibly damaging the wall and/or vehicle and requiring expensive repairs or replacement. If, on the other hand, the operator underestimates the distance between the front bumper of the vehicle and the rear wall of the garage, the operator may prematurely park the vehicle before the vehicle is pulled completely into the garage. In this case, the rear of the vehicle may not clear the garage door and be struck thereby when the garage door is closed possibly damaging the vehicle and/or the garage door itself and again necessitating potentially expensive repairs.

It is also known that vehicle garages often become storage areas for a myriad of items such as lawn mowers, gardening equipment, tools, bicycles, luggage, etc. further complicating the positioning of a vehicle in a garage. Thus, to optimize useful space within a garage, it may be desirable to laterally position a vehicle only far enough from at least one side wall of the garage to enable the side door or doors of the vehicle to be fully opened to enable passengers and driver to enter and exit the vehicle. If the vehicle is parked too close to a side wall, it may be impossible to fully open the vehicle doors adjacent the sidewall. Furthermore, a side door may be caused to strike a sidewall (or other obstruction) if insufficient space is provided between the side of the vehicle and the sidewall (or other obstruction) resulting in possible damage to the door and/or the side wall.

Many techniques, some simple and some complex, have been developed to assist an operator of a vehicle with the positioning of a vehicle within a garage. Virtually everyone is familiar with the well-known tennis ball suspended on a string from the ceiling of a garage. It is also well known to place an obstacle (e.g. a piece of lumber) in the path of the vehicle to mark a desired location. Both techniques are inexpensive and simple to implement; however, both have disadvantages. The piece of lumber can be inadvertently moved from its desired location. If secured to the garage floor, the lumber becomes a hazard that could cause someone to trip and fall. While the dangling tennis ball represents less of a hazard, it can still be annoying. Furthermore, these approaches provide little assistance with respect to the lateral positioning of the vehicle.

Other mechanical arrangements are known for assisting in the positioning of a vehicle in a garage. Some of these involve the use of guides affixed to the garage floor, ceiling, and/or walls. Vertical or horizontal line-of-sight posts may be employed to assist the vehicle's operator. Still other mechanical arrangements may utilize levers, rods, floor sensors, and/or switches including pressure switches that are physically engaged by the vehicle when the vehicle is properly positioned within the garage.

In addition to the above described mechanical systems, various electrical-based automobile positioning systems have been developed. For example, an electronic version of the dangling tennis ball includes a housing that contains an electrical circuit including a light bulb and a switch. The switch operates to light and unlight the bulb. A power supply and a cord suspend the housing from the ceiling of a garage into the pathway of a vehicle to be parked. When the housing is contacted by the vehicle, the switch is closed causing the bulb to light and signal the driver that the vehicle has reached its predetermined parking position.

In some cases, parking assistance systems may include complex arrangements of transmitters and sensors (e.g. infrared) located, for example, on or proximate to the garage door. Ultrasonic pulse generators and associated circuitry have also been employed to alert a driver when a vehicle has reached a predetermined position. Furthermore, optical systems utilizing video cameras, mirrors (e.g. to reflect brake lights to the operator of the vehicle), projection systems, and the like have been employed in vehicle parking assistance systems.

Parking assistance systems of the types described above suffer certain disadvantages. For example, many prior art systems rely on a driver's line of sight, which may vary from driver to driver. Thus, the system may have to be adjusted and/or recalibrated for each new driver. Mechanical systems are subject to being damaged themselves due to repeated impact and/or contact with the vehicle itself. Generally speaking, many of the prior art systems are high cost and relatively complex. Although less reliable, prior art devices intended for home use are less expensive, they are also less reliable. Thus, it should be appreciated that it would be desirable to provide a vehicle parking assistance system which combines the reliability and accuracy of complex, high cost vehicle positioning systems with the low cost and simplicity of less sophisticated systems. Furthermore, other desirable features and characteristics of the present invention will become apparent from the following detailed description and the appended claims, taken in conjunction with the accompanying drawings.

BRIEF SUMMARY OF THE INVENTION

According to an aspect of the invention there is provided a vehicle parking system for assisting an operator of a vehicle with parking in an enclosure that has at least a rear wall and a side wall. A first light source is mounted on the vehicle for directing a first beam of light forward from the vehicle and onto the rear wall. A second light source is mounted on the vehicle for directing a second beam of light forward from the vehicle and onto the rear wall. The second beam of light forms an angle with the first beam of light and the distance is substantially proportional to the distance between the front most region of the vehicle and the rear wall.

According to a further aspect of the invention there is provided a vehicle parking system that assists the operator of a vehicle with parking the vehicle in an enclosure. The enclosure has a rear wall and a side wall. A first light source is mounted on the vehicle and directs a first beam of light onto the side wall to create a first lighted region on the side wall to mark the vehicle's forward progress. A second light source is mounted on the vehicle and directs a second beam of light onto the rear wall to create a second lighted region to indicate the distance between the rear wall and the front most region of the vehicle.

BRIEF DESCRIPTION OF THE DRAWINGS

The present invention will hereinafter be described in conjunction with the following drawings, wherein like reference numerals denote like elements.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the proceeding technical field, background, brief summary, or the following detailed description.

Figure 1:
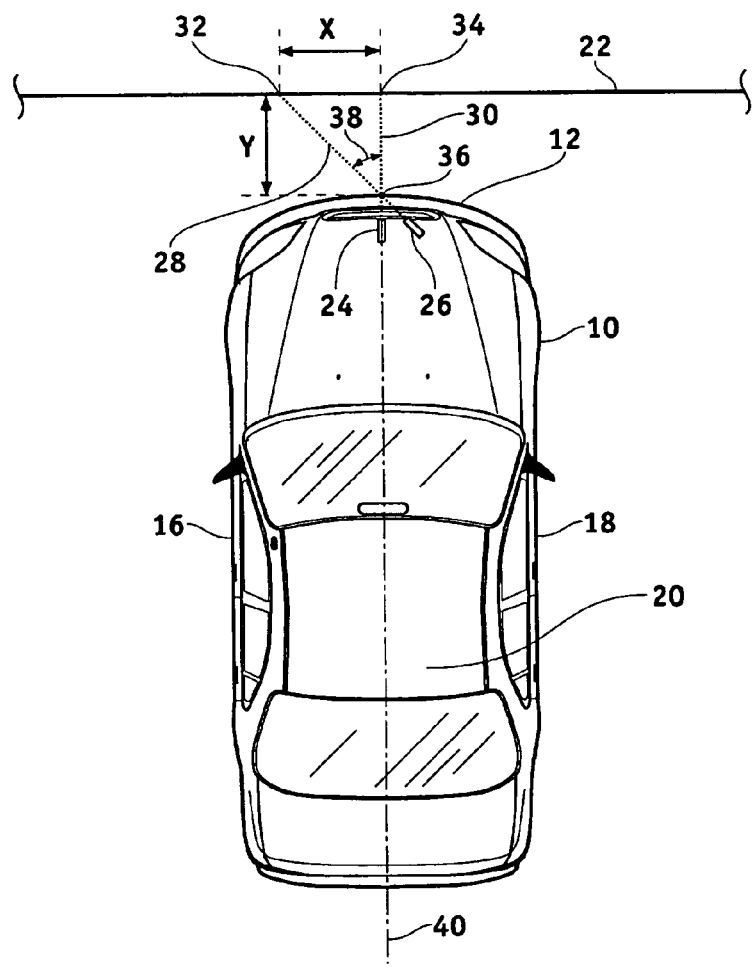
FIG. 1 is a top view of a vehicle utilizing a first embodiment of the inventive parking assistance system.
Figure 2:
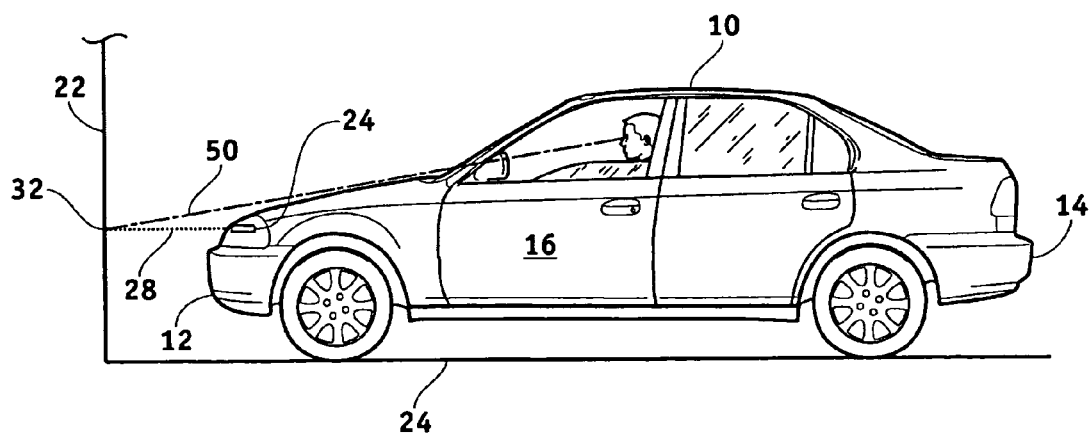
FIG. 2 is a side view of the embodiment shown in FIG. 1.

FIG. 1 and FIG. 2 are top and side views respectively of a vehicle 10 having a front most section 12 and a rear most section 14 and first and second side portions 16 and 18 respectively. As used herein, the word "vehicle" is intended to mean any type of vehicle including, but not limited to, an automobile, a truck, a trailer, a motor home, or the like, or any other type of equipment which must be maneuvered by an operator thereof to a predetermined position with respect to an obstacle. For the sake of clarity, however, the invention will be described in connection with the parking of an automobile in a garage.

FIGS. 1 and 2 are top and side views respectively of an automobile equipped with the inventive vehicle parking assistance system. Automobile 10 comprises a front most section 12 (e.g. a front bumper), a rear most section 14 (e.g. a rear bumper), first and second side sections 16 and 18 respectively, and a cab section 20 within which an operator resides for operating the automobile in the well known manner. Automobile 10 is shown as being positioned within an enclosure (e.g. a garage) which includes a forward obstacle 22 (e.g. the rear wall of the garage) and a floor 24.

As stated previously, if the operator of the automobile overestimates the distance between the front most portion 12 of automobile 10 and rear wall 22 of the garage (or other obstruction in front of the automobile), the operator may cause automobile 10 to strike wall 22 possibly damaging the wall which may in turn require expensive repairs or replacements. If, on the other hand, the operator underestimates the distance between front most portion 12 of automobile 10 and rear wall 22, the operator may prematurely park the vehicle before the vehicle is pulled completely into the garage. In this case, the rear most portion 14 of automobile 10 may not clear the garage door (not shown) and be struck thereby when the garage door is closed possibly damaging the vehicle and/or the garage door itself, and as a result necessitating potentially expensive repairs. To prevent this, first and second light sources 24 and 26 respectively are installed on automobile 10 as shown. Light sources 24 and 26 generate first and second light beams 28 and 30 respectively which impinge upon wall 22 as automobile 10 is driven forward to a predetermined parking position. Light beams 28 and 30 produce first and second lighted regions or dots 32 and 34 respectively on wall 22 which may be viewed by the operator of automobile 10. Light sources 24 and 26 may be of a conventional nature, lasers (e.g. class III A lasers) or any other suitable light source which will produce the necessary light beams 28 and 30.

As can be seen, light beam 28 forms and angle 38 with light beam 30. In a preferred embodiment, light beams 28 and 30 are substantially parallel to floor 24. Light beam 30 is directed along a path that is substantially parallel to a longitudinal axis 40 of automobile 10, and angle 38 is approximately 45 degrees. Furthermore, in the preferred embodiment, light beams 28 and 30 intersect at the front most point 36 of automobile 10.

Figure 5:
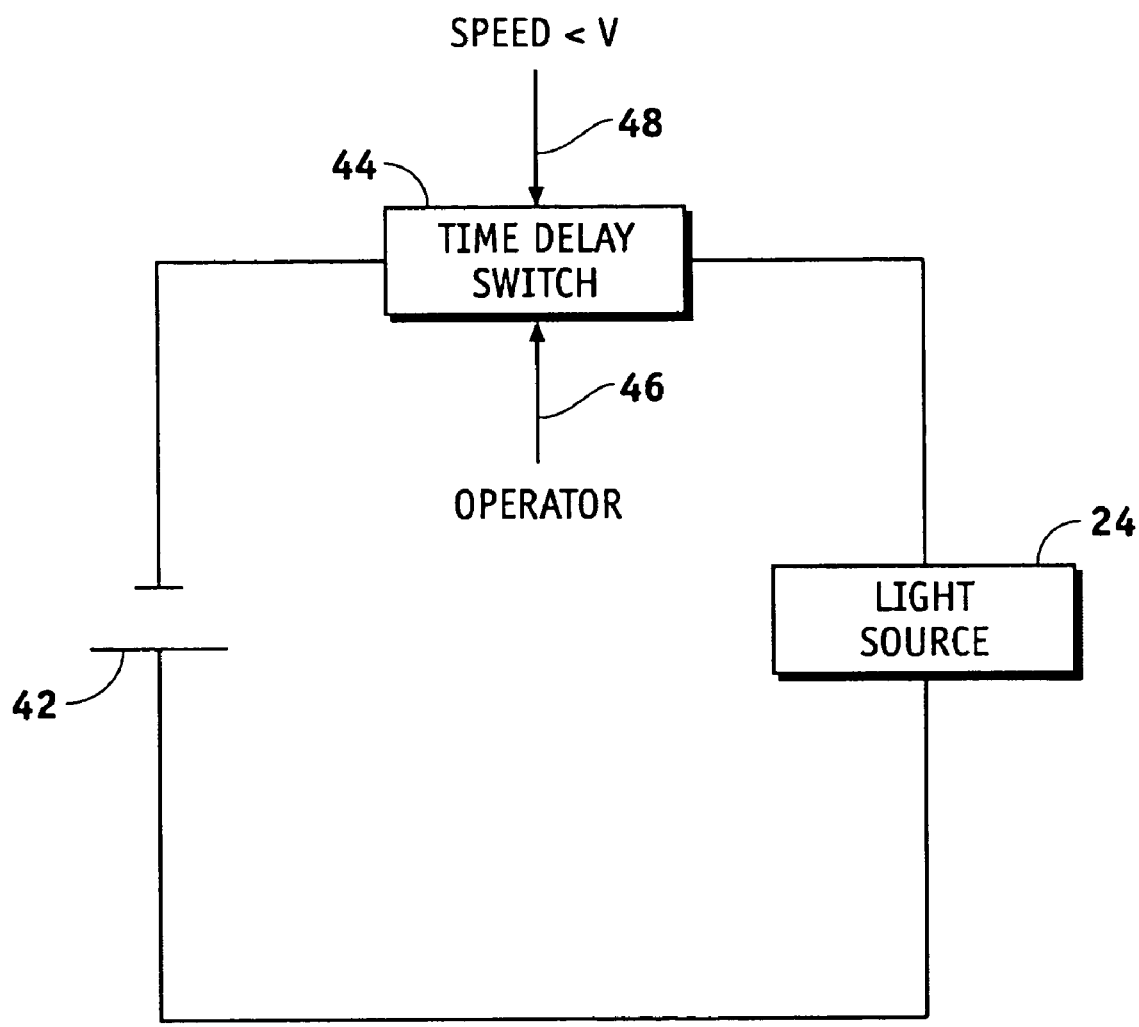
FIG. 5 is a block diagram illustrating how light sources utilized in the embodiments shown in FIGS. 1 and 3 are activated.

Referring to FIG. 5, the light sources (e.g. light source 24) and powered by battery 42 which may correspond to the vehicle's battery. A time delay switch 44 is interposed between light source 24 and battery 42 and may be activated by the operator of the vehicle as is shown at 46 as the operator drives the vehicle into a garage. Switch 44 may be a time delay switch which enables the vehicle parking assistance system for an amount of time sufficient to enable the operator to guide the vehicle to a predetermined position within the garage. For example, switch 44 may automatically connect the light sources from battery 42 for approximately one minute and then automatically turn the system off. Additionally, if desired, the system may be disabled (i.e. even upon activation of switch 44) if the vehicle is traveling at a speed greater than a predetermined speed; for example, five miles per hour.

Referring again to FIGS. 1 and 2, two illuminated dots 32 and 34 will be generated by light beams 28 and 30 respectively on wall 22. These dots lie within the driver's field of view as is indicated by line 50 in FIG. 2. As automobile 10 is driven towards wall 22, dot 32 will move towards dot 34. If, as previously described, light beams 28 and 30 intersect at a point 36 corresponding substantially to the front most point of automobile 10 and if angle 38 is approximately forty-five degrees, then the distance X substantially corresponds to the actual distance Y between the front most point 36 of automobile 10 and wall 22 thus providing the driver with an indication of the actual distance between the front of vehicle 10 and the rear wall of the garage. If light source 24 is mounted along the longitudinal center line of automobile 10, the driver receives immediate feedback regarding the location of the center of automobile 10 and its actual distance from wall 22. It should be clear that a similar arrangement of light sources could be mounted at the rear of the vehicle to provide the operator with a visual indication of the distance between the rear most point of the vehicle and the garage door.

Figure 3:
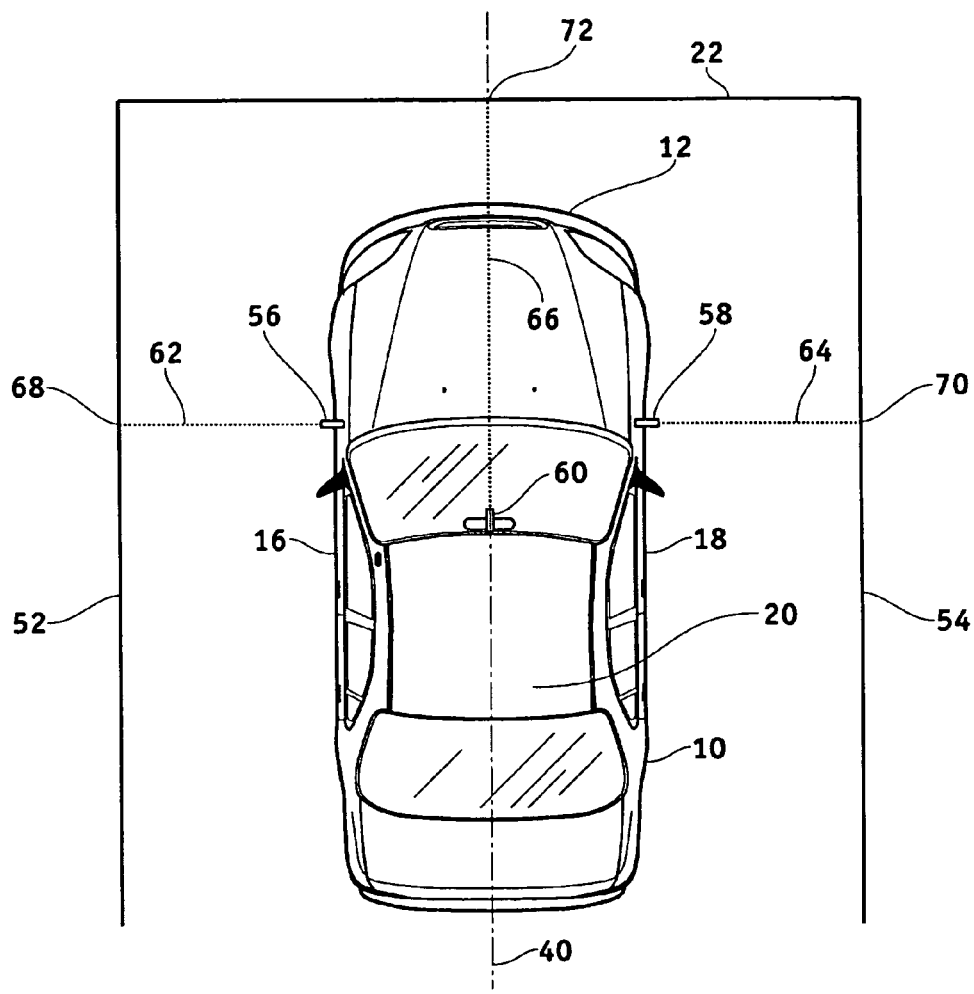
FIG. 3 is a top view of a vehicle utilizing a second embodiment of the inventive parking assistance system.
Figure 4:
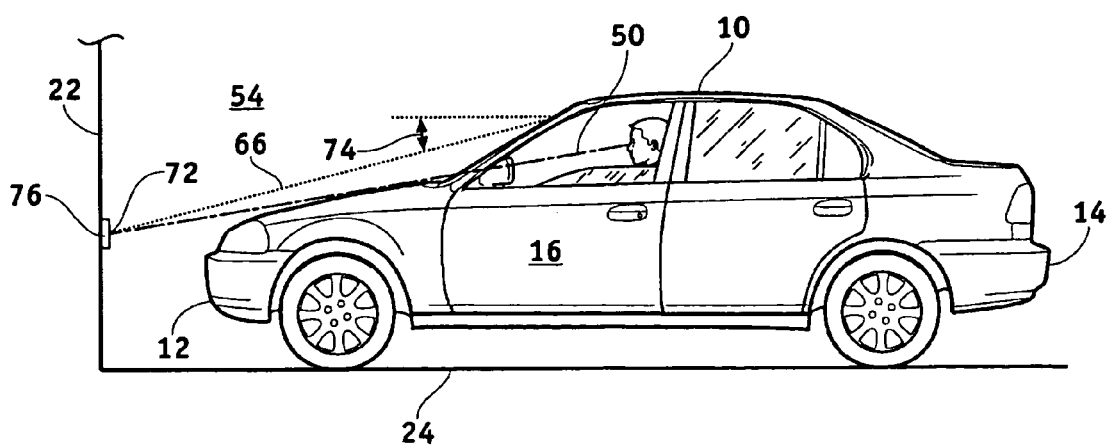
FIG. 4 is a side view of the embodiment shown in FIG. 3.

FIGS. 3 and 4 are top and side views of a second embodiment of the inventive vehicle parking assistance system wherein like elements are denoted with like reference numerals. In this case, the enclosure or garage is shown as including rear wall 22 and sidewalls 52 and 54. The embodiment shown in FIGS. 3 and 4 includes three light sources 56, 58, and 60 mounted on vehicle 10 for generating first, second and third light beams 62, 64, and 66 respectively. Lateral light beams 62 and 64 may be directed onto side walls 52 and 54 respectively of the garage to produce illuminated dots 68 and 70 respectively on the sidewalls. In a preferred embodiment, light beams 62 and 64 are directed substantially perpendicularly to the longitudinal axis 40 of the vehicle. Light beam 66 is directed forward along the center line of automobile 10 so as to create an illuminated region or spot 72 on rear wall 72.

Referring to FIG. 4, it can be seen that light beam 66 is directed downward from horizontal by an angle 74 (e.g. 2–10 degrees). Angle 74 is chosen so that if rear wall 72 were not interposed in the path of light beam 66, it would impinge the plane of floor 24 at a distance d from the front most portion 12 of automobile 10. As was the case previously, light sources 56, 58, and 60 may be powered by the vehicle's battery 42 and a time delay switch 44 shown in FIG. 5. Thus, the vehicle parking assistance system shown in FIGS. 3 and 4 is activated by the operator of automobile 10 as the operator drives into the garage and will remain on for a predetermined period of time (e.g. one minute) and then automatically turn off. This allows sufficient time for the operator to position the vehicle in its proper location while at the same time eliminates the possibility that the driver will forget to turn the system off. Also, as stated above, if automobile 10 is moving above a predetermined speed (e.g. five miles per hour), the system may be disabled as shown at 48.

When the vehicle parking assistance system shown in FIGS. 3 and 4 is activated, light beam 66 will mark and identify the vehicle's center position. Light beams 62 and 64 will mark and identify the vehicle's forward position on the side walls. As automobile 10 moves forward towards rear wall 22, the illuminated dot 72 will move upward on the rear wall. In this manner, light beam 66 indicates the vehicle's distance from rear wall 22. If desired, the location of dot 72 may be marked as, for example, by placing a target 76 on rear wall 22 when automobile 10 is properly positioned with the garage. Similar targets could be placed on sidewalls 52 and 54. In this manner, the operator of automobile 10 is easily guided to the proper predetermined location; that is, when dots 68, 70, and 72 impinge upon their respective targets. Since the system shown in FIGS. 3 and 4 provides three reference points (68, 70, and 72), it is more flexible and may be better suited in the garage which contains other objects of the type described above located along the side walls and rear wall of the garage.

While certain exemplary embodiment has been presented in the foregoing detailed description, it should be appreciated that a vast number of variations exist. For example, light beam 66 could be directed forward at an angle upward from horizontal. In this case, dot 72 will move downward on rear wall 22 as vehicle 10 approaches. It should also be appreciated that the exemplary embodiments are only examples, and are not intended to limit the scope, applicability, or configuration of the invention in any way. Rather, the foregoing detailed description will provide those skilled in the art with a convenient road map for implementing the exemplary embodiments. It should be understood that various changes can be made in the function and arrangement of elements without departing from the scope of the invention as set forth in the dependent claims and the legal equivalence thereof.

What is claimed is:

1. A vehicle parking system for assisting the operator of a vehicle with parking in an enclosure having a rear wall and a side wall, the vehicle having a front most region, the system comprising:
   a first light source mounted on the vehicle for directing a first beam of light forward of said vehicle and onto the rear wall creating a first lighted region on the rear wall; and
   a second light source mounted on the vehicle for directing a second beam of light forward of said vehicle and onto the rear wall creating a second light region on the rear wall, said second beam of light forming an angle with said first beam of light, and the distance between said first lighted region and said second lighted region being substantially proportional to the distance between the from-most region of the vehicle and the rear wall.

2. A vehicle parking system according to claim 1 wherein said first light source and said second light source are mounted proximate said front most region.

3. A vehicle parking system according to claim 1 wherein said first beam of light and said second beam of light intersect at a point proximate said front most region.

4. A vehicle parking system according to claim 3 wherein said angle is approximately forty-five degrees.

5. A vehicle parking system according to claim 4 wherein said first beam of light is directed forward substantially parallel to a longitudinal axis of the vehicle.

6. A vehicle parking system according to claim 5 wherein said first beam of light and said second beam of light are directed forward substantially parallel to a floor of the enclosure.

7. A vehicle parking system according to claim 6 wherein said first light source is a first laser.

8. A vehicle parking system according to claim 7 wherein said second light source is a second laser.

9. A vehicle parking system according to claim 1 wherein said first lighted region marks the vehicle's center position.

10. A vehicle parking system according to claim 9 further comprising a third light source mounted on the vehicle for directing a third beam of light onto the side wall to create a third lighted region on the side wall for marking the vehicle's forward position.

11. A vehicle parking system according to claim 10 wherein said third light beam is directed substantially perpendicularly to the longitudinal axis of the vehicle.

12. A vehicle parking system according to claim 11 wherein said third light source is a third laser.

13. A vehicle parking system according to claim 10 further comprising a battery on-board the vehicle and electrically coupled to said first, second, and third light sources.

14. A vehicle parking system according to claim 13 further comprising a switch coupled between said battery and said first, second, and third light sources.

15. A vehicle parking system according to claim 14 wherein said switch is operator activated.

16. A vehicle parking system according to claim 15 wherein said switch is a time-delay switch.

17. A vehicle parking system for assisting the operator of a vehicle with parking the vehicle in an enclosure comprising a floor, a rear wall, and a side wall, said vehicle having a front most region, the system comprising:
   a first light source mounted on the vehicle for directing a first beam of light onto the side wall to creak a first lighted region on the side wall for marking the vehicle's forward progress; and
   a second light source mounted on the vehicle for directing a second beam of light onto the rear wall to create a second lighted region for indicating the distance between the rear wall and the front most region of the vehicle.

18. A vehicle parking system according to claim 17 wherein said second light beam is angled with respect to a plan substantially parallel to the floor of the enclosure.

19. A vehicle parking system according to claim 18 further comprising a target mounted on the rear wall.

20. A vehicle parking system according to claim 19 wherein said second light beam is angled upward such that said second lighted region migrates downward toward said target as the vehicle moves toward the rear wall.

21. A vehicle parking system according to claim 19 wherein said second light beam is angled downward such that said second lighted region migrates upward toward said target as the vehicle moves toward the rear wall.

22. A vehicle parking system according to claim 21 wherein said second light beam is angled downward by approximately 2–10 degrees.

23. A vehicle parking system according to claim 21 wherein said second light source is mounted proximate the front most region.

24. A vehicle parking system according to claim 23 wherein the vehicle comprises an external, side rear-view mirror and wherein said first light source is mounted proximate said external, side rear-view mirror.

25. A vehicle parking system according to claim 24 wherein the vehicle comprises an internal, rear-view mirror and wherein said second light source is mounted proximate said internal, rear-view mirror.

26. A vehicle parking system according to claim 21 wherein said first light source and said second light source are lasers.

27. A vehicle parking system for assisting the operator of a vehicle with parking the vehicle in an enclosure having a rear wall and a side wall, the vehicle having a front most region, the system comprising:

a first light source mounted on the vehicle proximate the front most region for directing a first beam of light forward of the vehicle and onto the rear wall; and a second light source mounted on the vehicle proximate the front most region for directing a second beam of light forward of the vehicle and onto the rear wall, said second beam of light forming an angle with said first beam of light such that the distance between the first beam and the second beam on the rear wall remains substantially equal to the distance between the front most region and the rear wall.

28. A vehicle parking system according to claim 27 wherein said angle is substantially forty-five degrees.

29. A vehicle parking system according to claim 28 wherein said first beam of light is directed forward substantially parallel to a longitudinal axis of the vehicle.

30. A vehicle parking system according to claim 29 wherein said first beam of light and said second beam of light are directed forward substantially parallel to the floor of the enclosure.

* * * * *